Figure 1:
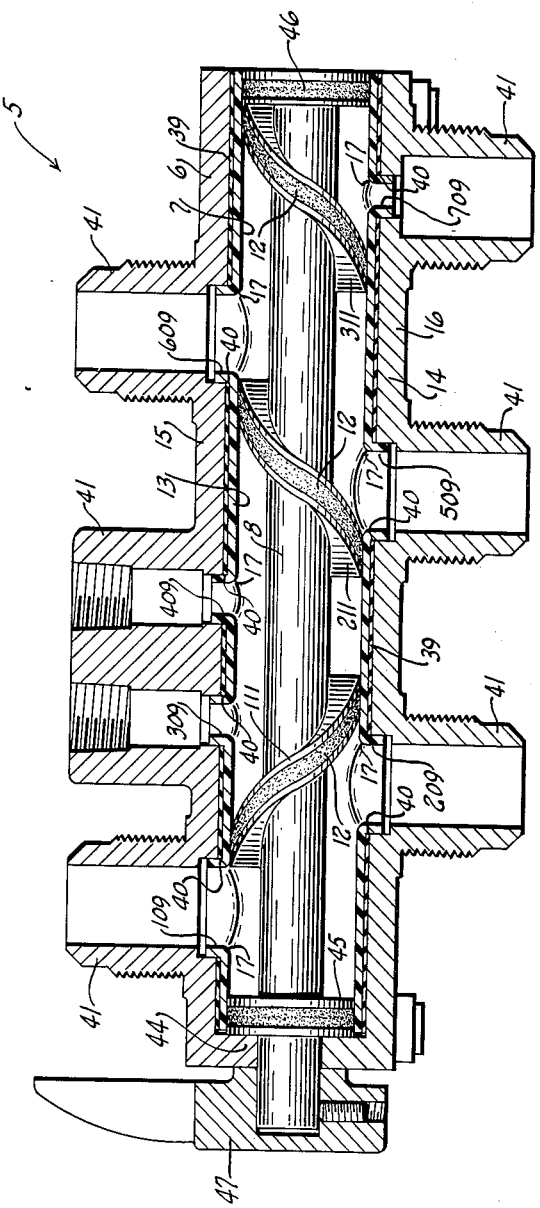

May 21, 1963

J. RUDELICK 3,090,396

ROTATABLE SPINDLE VALVE

Filed Feb. 10, 1960

2 Sheets-Sheet 1

Inventor
John Rudelick
By Ira Milton Jones
Attorney

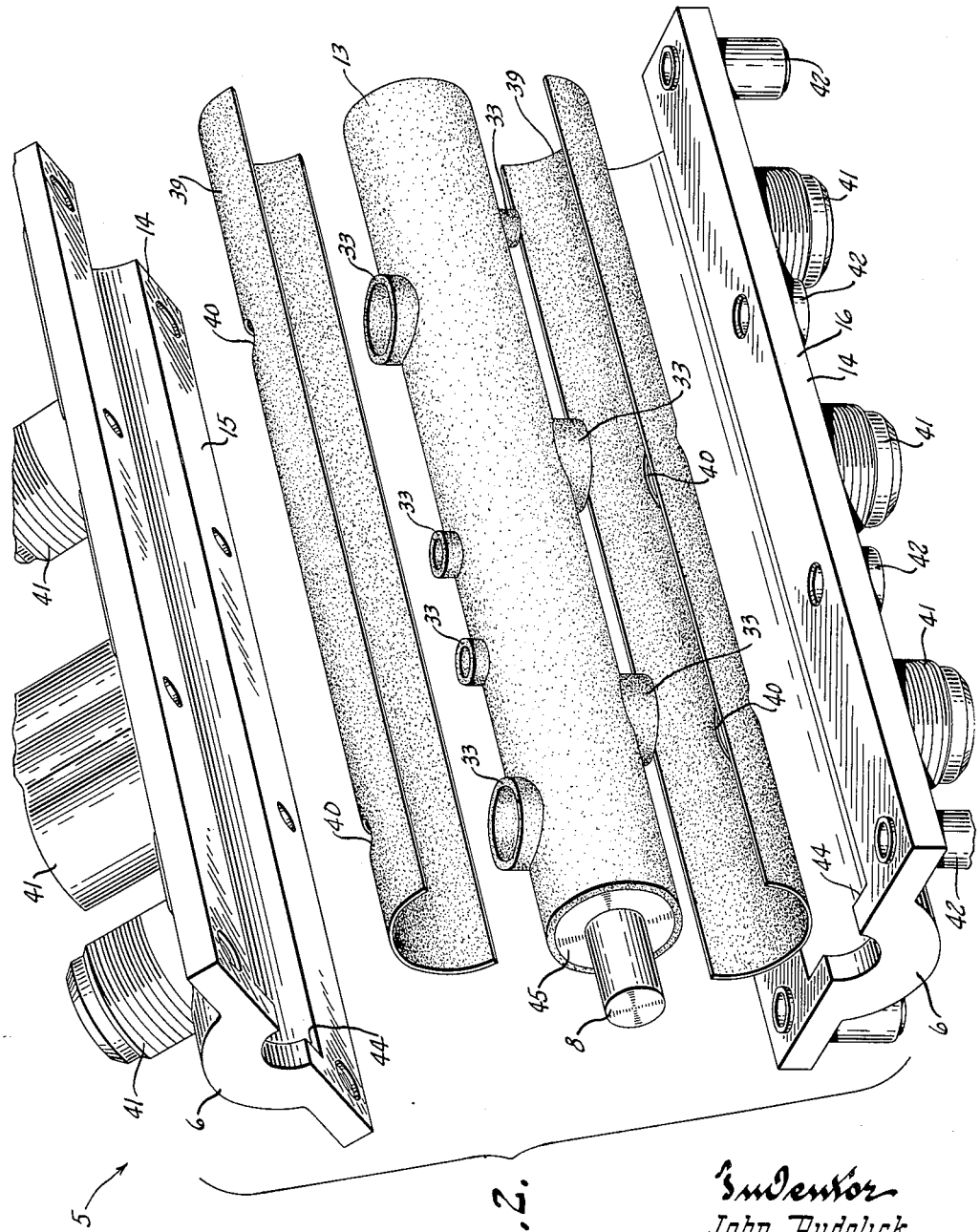

United States Patent Office 3,090,396
Patented May 21, 1963

3,090,396
ROTATABLE SPINDLE VALVE
John Rudelick, Milwaukee, Wis., assignor to Bruner Corporation, Milwaukee, Wis., a corporation of Wisconsin
Filed Feb. 10, 1960, Ser. No. 7,832
1 Claim. (Cl. 137—375)

This invention relates to spool valves and refers more particularly to a valve of the type having a bored body and a spindle coaxially rotatable in the bore in the body, and wherein the spindle has a circumferential land lying in a plane disposed at an oblique angle to the spindle axis and snugly engaging the wall of the body bore to control communication between a pair of ports in the valve body, at least one of which opens laterally from the bore. Rotatable spindle valves of this type are shown in the copending applications of John Rudelick, Serial No. 66,379, filed October 26, 1960 for Brine Making and Dispensing Device, now Patent No. 3,058,816 and Serial No. 859,871, filed December 16, 1959, for Water Softening Apparatus.

Rotatable spindle valves of the type here under consideration have been known for a long time, but despite their great potential utility they have heretofore had only very limited use. This is because the obvious theoretical advantages of such a valve are outweighed by the practical manufacturing problem of making it so that it will function satisfactorily.

Specifically, the land or lands on the rotating spindle, which control communication between the ports in the valve body, must be in sealed but slidable engagement with the wall of the bore in which the spindle rotates, around the entire circumference of the bore, for otherwise there will be leakage past the lands and the valve will not be effective to completely disrupt communication between the ducts with which it is connected. Obviously it would be a practical impossibility to use metal for both the inner surface of the bore in the valve body and the circumferential surfaces of the lands on the spindle, because the extremely accurate machining and finishing of the slidingly engaging land and body surfaces, necessary to insure a good seal between them, could scarcely be obtained in normal production.

It has therefore been proposed to provide each land with a softer gland-like sealing surface, such as a rubber O-ring or the like seated in a radially outwardly opening groove in the land, by which a good seal between the land and the bore wall could be effected. But this expedient, too, encountered practical difficulties. When the spindle was left stationary for a protracted period of time, the rubber of the O-ring tended to "cold flow" into the pores of the valve body metal, thus preventing rotation of the valve, at least without serious damage to the O-ring.

Even where such cold flow was prevented by various expedients, another serious problem existed with rotatable spindle valves equipped with O-ring land seals. The port or ports in the valve body which opened laterally from its bore were normally formed by boring or coring the valve body, and consequently the junction between each such port and the bore in the valve body presented a sharp edge all the way around the port. As the spindle was rotated in the bore, the O-rings were compelled to slide across the sharp edges on the ports and were severely cut and abraded by them, so that the useful life of an O-ring seal on a land frequently terminated after only a very few rotations of the spindle.

Various expedients were resorted to in an effort to overcome this cutting of the O-rings. It was appreciated that the O-ring was engaged against the sharp edge of the port under substantial pressure, due to its compressive confinement between the land on the spindle and the wall of the valve body bore; and in an effort to prevent the expansion of the O-ring into the port which promoted such cutting, the port was in some instances formed by a plurality of small apertures, providing a sort of grillwork which substantially held the O-ring against local expansion as it crossed the port area.

Another possible solution to the problem of O-ring cutting was the chamfering or rounding of the corner at the junction between each port and the bore. However, in order to assure that the bore would have a perfectly circular cross section and that the valve body would not leak, it was necessary to form the valve body in one piece, as a substantially tubular member, and consequently it was at best extremely difficult to get a tool inside the valve body to accomplish such rounding or chamfering at the ports.

With the foregoing in mind, it is the general object of this invention to provide a rotating spindle valve of the character described, having O-ring seals on the lands of its spindle, which overcomes the problems that have heretofore rendered such valves expensive and impracticable, and which valve can be inexpensively manufactured with very simple apparatus and by relatively unskilled labor.

More specifically it is an object of this invention to provide a rotating spindle valve of the character described wherein the bore in the valve body is defined by a smooth, seamless tubular member of thermoplastic material, so that the valve body cannot leak and so that cold flow bonding cannot take place between O-rings on the spindle lands and the material of the valve body, thus assuring both easy rotation of the spindle and a good seal between the lands of the spindle and the walls of the body in every rotational position of the spindle.

Another specific object of this invention is to provide a body for a rotating spindle valve of the character described, which body may be very readily formed in one piece by a simple operation but nevertheless has rounded or chamfered edges at the junctions of its bore and the ports opening laterally therefrom, so that said valve body has no tendency to cut or abrade O-rings which form a seal between the spindle lands and the wall of the valve body bore.

With the above and other objects in view which will appear as the description proceeds, this invention resides in the novel method and apparatus, substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

FIGURE 1 is a longitudinal sectional view of a rotating spindle valve embodying the principles of this invention; and FIGURE 2 is a disassembled perspective view of a valve body incorporating the principles of this invention.

Referring now to the accompanying drawings, the numeral 5 designates generally a rotating spindle valve embodying the principles of this invention, comprising, in general, an elongated valve body 6 having a bore 7 extending lengthwise therethrough and a spindle 8 coaxially rotatable in the bore in the valve body. Intermediate its ends the valve body has axially spaced apart ports 109, 209, 309, 409, 509, 609 and 709 opening from its bore at opposite sides of the valve body, and communication between these ports, through the bore 7, is controlled by lands 111, 211 and 311 on the spindle 8, each disposed in a plane that is obliquely inclined to the spindle axis. Each land includes a rigid portion, which may be formed integrally with the spindle, and a rubber O-ring 12 or the like that provides a good seal between the land and the inner surface of the tubular valve body and which is received in a radially outwardly opening slot in the rigid portion of the land. Alternatively the spindle might have rubber lands molded directly thereon.

For purposes of illustration the valve shown in the drawings is a control valve for a water softener, and for a complete description of its function and manner of operation reference may be made to the copending application above referred to, Serial No. 859,871, or to Patent No. 3,058,816.

In one rotational position of the spindle 8, illustrated in FIGURE 1, the land 111 blocks communication between the port 209 and ports 309 and 409, while permitting communiaction between ports 109 and 209; but when the spindle is rotated through half a revolution from the position shown, it disrupts communication between ports 109 and 209 and permits free communication between port 109 and port 309. The lands 211 and 311 of course function in a similar manner with respect to the other ports. Obviously a rotating spindle valve can also provide for metered flow from one port to another in its valve body when its spindle is placed in intermediate rotational positions.

It will be appreciated that only one laterally opening port need be provided in the valve body in a rotating spindle valve having a single spindle land, as in a faucet, the other port being at one end of the valve body and opening axially into the bore. Such an arrangement is possible because the body of the spindle has a diameter which is substantially smaller than that of the bore, so that fluid can flow axially through the valve body bore without interference from the spindle, but subject to control by the land or lands.

It will be appreciated, as the description proceeds, that the herein described invention also finds utility in spool valves of the type wherein a spindle having circumferential lands lying in planes normal to its axis moves axially in a valve body.

The valve of this invention is characterized by the fact that its body 6 comprises a tubular liner 14 of thermoplastic material, within which the spindle operates, surrounded by a rigid metal shell 14 consisting of a pair of laterally separable complementary shell members 15 and 16. The liner can be very readily formed from a single length of thermoplastic tubing, and its provision insures that the O-rings 12 will afford a good seal with the inner valve body surface defining the bore 7 without any possibility of cold-flow bonding occurring between the O-rings and said surface. In most cases, too, the thermoplastic affords a low friction surface cooperable with the O-rings 12, so that the spindle can be easily rotated. The provision of the liner 13 is also advantageous because of the fact that thermoplastic material is inert and non-corroding, so that it is not attacked by water or any of the minerals commonly present in untreated water. The outstanding advantage of the thermoplastic liner, however, is that it readily permits the formation of a chamfer or bevel 17 at the junction of each port with the bore 7, whereby the O-rings are enabled to ride smoothly across the port openings without being cut or abraded as the spindle is rotated.

To form the valve body liner, a blank comprising a straight length of thermoplastic tubing of appropriate length and wall thickness is subjected to heat and pressure in a suitably shaped mold in the manner disclosed in my copending application Serial No. 104,614, filed April 21, 1961 as a division of this application. This causes the wall of the tubing to be locally expanded to form blister-like protuberances with cylindrical side walls at the locations where the ports are to appear, and after the tubing is removed from the mold the outer ends of the protuberances are bored or cut away to thus provide integral collar like projections 33 that serve as the port openings.

Any of the high density thermoplastics which are suitable for vacuum forming when in the form of sheet stock are satisfactory for tubular blanks intended to be made into valve body liners in accordance with the principles of this invention. Materials which have been found suitable for the purpose include polystyrene, vinyl, kralastic, acrylic resins and polyethylene. The wall thickness of the tubing is not critical, so long as it is large enough to be leakproof and to bear some degree of local expansion without rupturing.

It will be observed that the formation of the collar-like projections 33 by the procedure indicated results in the rounding or chamfering, as at 17, of each junction between a collar-like projection and the bore in the tubular body portion of the liner.

The metal shell 14 in which the liner of this invention is preferably enclosed to form the complete valve body 6 provides for connection of ducts or duct fittings to the valve body as well as providing reinforcement and support for the thermoplastic liner. It is conceivable, however, that in some cases the outer shell could be omitted, especially where the thermoplastic "liner" has a relatively thick wall. Preferably the complementary members 15 and 16 which cooperate to form the valve body shell 14 are separable on a plane which corresponds to the plane of separation of the mold members 20 and 21, which plane is normal to the axes of the collar-like port projections 33.

Since duct connections to the valve body are made only to bosses or nipples 41 formed in the complementary shell members, there is a possibility that leakage may occur between the liner and the shell members around the exteriors of the collar-like projections 33, and to guard against this, in cases where such leakage cannot be tolerated, a suitable seal may be provided between the liner and the shell members. Such a seal may take the form of a pair of resilient gasket sheets 39, each having a length substantially equal to that of the liner and a width substantially equal to half the circumference of the liner. Each of the gaskets 39 has suitable holes 40 to snugly accommodate the collar-like projections 33 on one side of the liner, and each is adapted to underlie the concave surface of one of the shell members, so that together they embrace the liner and are snugly confined between it and the shell members.

To hold the shell members together, embracing the liner and clamping the gaskets in sealing relation between the liner and the shell members, the latter may be provided with suitable aligning bored bosses 42 in which screws (not shown) may be received. The shell members may also include integral flange portions that define a shoulder 44 on one end of the housing provided by the shell, and which cooperates with means on the spindle to preclude axial displacement thereof. The ends of the bore are sealed by lands 45 and 46 on the spindle which lie in planes normal to its axis, and the land 45 adjacent to the shoulder 44 prevents axial movement of the spindle in one direction. An actuating knob 47, secured to the projecting end portion of the spindle adjacent to the shoulder 44, prevents axial movement of the spindle in the other direction.

From the foregoing description, taken together with the accompanying drawings, it will be apparent that this invention provides a rotating spindle valve having a simple, inexpensive liner of thermoplastic material which provides an inert and non-corroding surface at the interior of the valve body to which the seals on the spindle lands cannot bond themselves by "cold flow" adhesion, and which features chamfered or rounded surfaces around the junction between each port and the body bore whereby cutting and abrasion of the seal means on the spindle lands is prevented.

What is claimed as my invention is:

A valve comprising: means defining a hollow outer body comprised of separable complementary sections one of which has a passage opening from the interior of the body; a tubular thermoplastic inner body inside the outer body, defining a bore, and having an integral collar that projects laterally outwardly from its exterior to define a valve port, said collar extending into the passage in the outer body to hold the inner body against rotary and axial motion out of a position at which said port thereof registers with the passage in the outer body, the junction of the collar with the wall of the bore being rounded around the entire circumference of said valve port; means connecting the complementary outer body sections to hold them in place upon the inner body; a spindle coaxially movable in the bore of the inner body; a resilient land encircling the spindle and movable therewith, said land snugly and sealingly engaging the exterior of the spindle and the wall of the bore in the inner body to control communication between said valve port and another port in the valve in accordance with the position to which the spindle is moved, and said land being slidable smoothly across said rounded edge of the valve port regardless of the size relationship between it and the port so as to minimize the danger of the resilient land becoming damaged as it is moved across said valve port; and seal means encircling said collar at its junction with the exterior of the inner body, and confined between the bodies to prevent leakage of fluid from the port and passage along the exterior of the inner body.

References Cited in the file of this patent

UNITED STATES PATENTS

| | | |
|---|---|---|
| 512,892 | Munger | Jan. 16, 1894 |
| 1,568,451 | Gray | Jan. 5, 1926 |
| 1,787,628 | Jones | Jan. 6, 1931 |
| 1,985,382 | Schachter | Dec. 25, 1934 |
| 2,202,735 | Johnson | May 28, 1940 |
| 2,524,142 | Seeloff | Oct. 3, 1950 |
| 2,670,501 | Michiels | Mar. 2, 1954 |
| 2,676,609 | Pfarrer | Apr. 27, 1954 |
| 2,695,036 | Kronheim | Nov. 23, 1954 |
| 2,702,411 | Winstead | Feb. 22, 1955 |
| 2,796,887 | Stern | June 25, 1957 |
| 2,989,081 | Olsen | June 20, 1961 |

FOREIGN PATENTS

| | | |
|---|---|---|
| 3,939 | Great Britain | Feb. 22, 1893 |
| 374,018 | Great Britain | May 25, 1932 |